US011964343B2

(12) United States Patent
Chidambaram et al.

(10) Patent No.: US 11,964,343 B2
(45) Date of Patent: Apr. 23, 2024

(54) LASER DICING SYSTEM FOR FILAMENTING AND SINGULATING OPTICAL DEVICES

(71) Applicant: Applied Materials, Inc., Santa Clara, CA (US)

(72) Inventors: Mahendran Chidambaram, Saratoga, CA (US); Shmuel Erez, Saratoga, CA (US); Wei-Sheng Lei, San Jose, CA (US); John Rusconi, Dublin, CA (US)

(73) Assignee: Applied Materials, Inc., Santa Clara, CA (US)

( * ) Notice: Subject to any disclaimer, the term of this patent is extended or adjusted under 35 U.S.C. 154(b) by 294 days.

(21) Appl. No.: 17/183,777

(22) Filed: Feb. 24, 2021

(65) Prior Publication Data

US 2021/0276129 A1 Sep. 9, 2021

Related U.S. Application Data

(60) Provisional application No. 62/987,320, filed on Mar. 9, 2020.

(51) Int. Cl.
*B23K 26/362* (2014.01)
*B23K 26/06* (2014.01)
*B23K 103/00* (2006.01)

(52) U.S. Cl.
CPC ........ *B23K 26/362* (2013.01); *B23K 26/0643* (2013.01); *B23K 26/0648* (2013.01); *B23K 2103/50* (2018.08)

(58) Field of Classification Search
CPC .............. B23K 26/362; B23K 26/0643; B23K 26/0648; B23K 2103/50; B23K 26/0838;
(Continued)

(56) References Cited

U.S. PATENT DOCUMENTS

2003/0102016 A1* 6/2003 Bouchard ......... H01L 21/67028
134/32
2004/0001177 A1* 1/2004 Byun .................... G02F 1/1339
349/187
(Continued)

FOREIGN PATENT DOCUMENTS

CN 110299313 A * 10/2019 ....... H01L 21/02041
JP 2004526335 A 8/2004
(Continued)

OTHER PUBLICATIONS

International Search Report/Written Opinion issued to PCT/US2021/019715 dated Jun. 15, 2021.
(Continued)

*Primary Examiner* — Sang Y Paik
*Assistant Examiner* — Damon Joel David Alfaro
(74) *Attorney, Agent, or Firm* — Patterson + Sheridan, LLP

(57) ABSTRACT

A process of producing optical devices is provided including transferring a first substrate comprising one or more devices to a laser dicing tool, the laser dicing tool including a filamentation stage and a singulation stage. One or more device contours are created on the first substrate in the filamentation stage. The optical devices are singulated from the first substrate along the one or more device contours in the singulation stage. The devices are transferred to storage or for further backend processing.

8 Claims, 6 Drawing Sheets

(58) Field of Classification Search
CPC . B23K 26/0876; B23K 26/359; B23K 26/364
See application file for complete search history.

(56) References Cited

U.S. PATENT DOCUMENTS

| | | | | |
|---|---|---|---|---|
| 2006/0169680 | A1* | 8/2006 | Park | B23K 26/40 438/460 |
| 2012/0003788 | A1* | 1/2012 | Harley | B23K 26/067 257/E31.11 |
| 2014/0011337 | A1* | 1/2014 | Holden | B23K 26/364 438/462 |

FOREIGN PATENT DOCUMENTS

| | | | | |
|---|---|---|---|---|
| JP | 2011165768 | A | | 8/2011 |
| JP | 2012004478 | A | | 1/2012 |
| JP | 2002353169 | A | | 12/2022 |
| KR | 101015214 | B1 | | 2/2011 |
| KR | 101454319 | B1 | * | 10/2014 |
| KR | 101454319 | B1 | | 10/2014 |
| KR | 20160030039 | A | * | 3/2016 |
| KR | 20190056487 | A | * | 5/2019 |

OTHER PUBLICATIONS

Korean Office Action issued to Patent Application No. 10-2022-7034709 on Jan. 23, 2024.
Japanese Office Action issued to Patent Application No. 2022-553029 on Jan. 16, 2024.

* cited by examiner

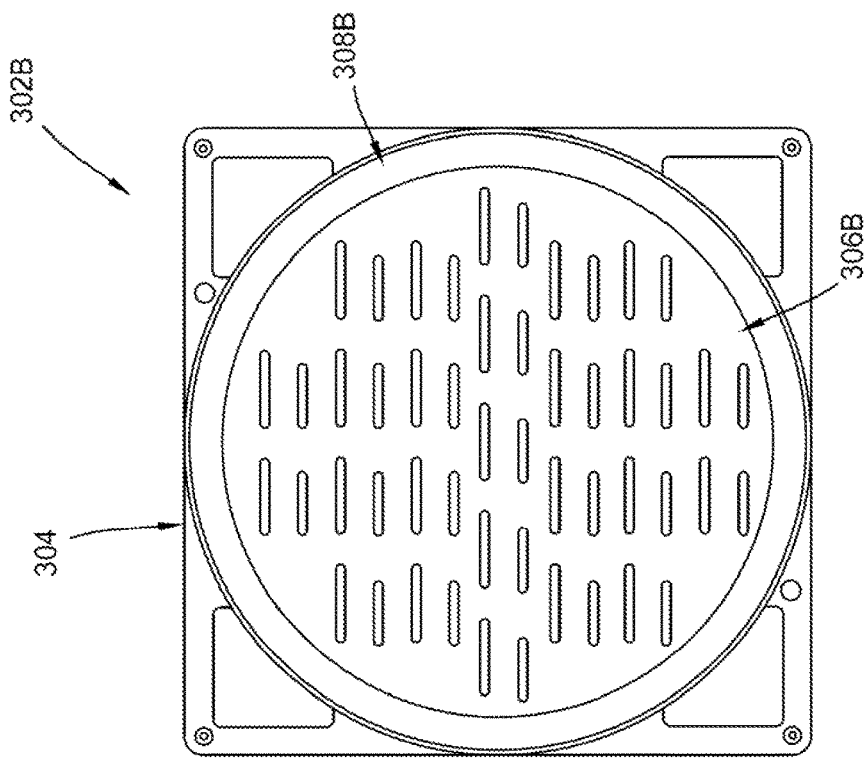
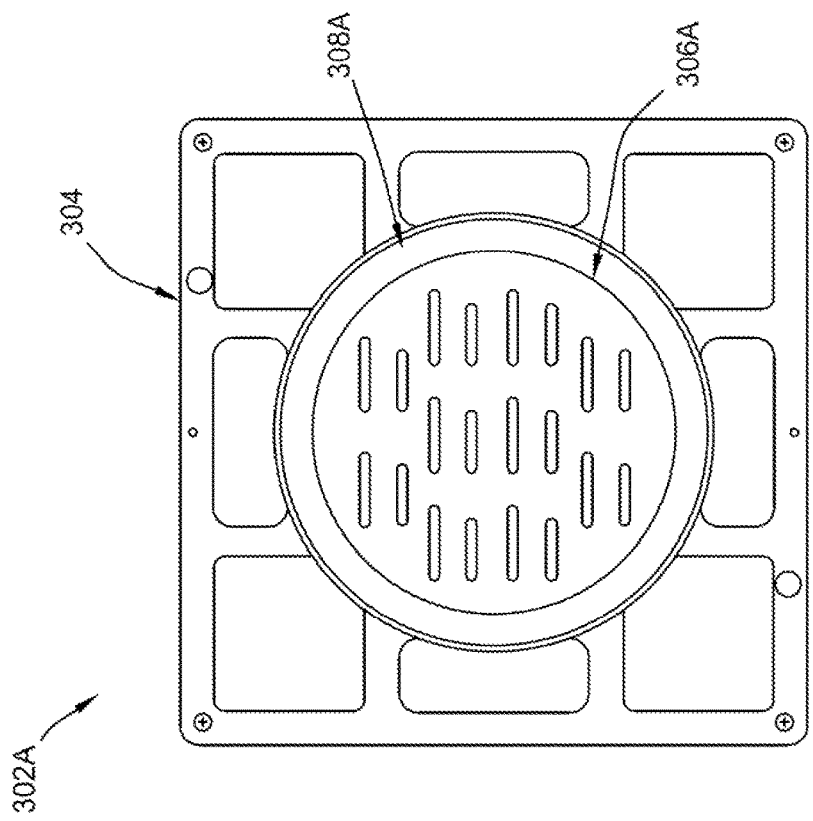

LASER DICING SYSTEM FOR FILAMENTING AND SINGULATING OPTICAL DEVICES

CROSS-REFERENCE TO RELATED APPLICATIONS

This application claims the benefit of U.S. Provisional Patent Application 62/987,320 filed on Mar. 9, 2020 which is herein incorporated by reference.

BACKGROUND

Field

Embodiments of the present disclosure generally relate to a laser dicing system for optical devices.

Description of the Related Art

In the manufacture of optical devices, such as optical devices for virtual reality or augmented reality, one or more devices having structures with sub-micron critical dimensions are disposed on a substrate for processing, such as a front side of the substrate. To manufacture the optical devices, a surface of the substrate having the one or more devices disposed on the surface must be retained on a substrate support assembly without contacting the one or more devices, and a plurality of substrates must be processed at a plurality of processing stations throughout the manufacturing process. Current systems for processing substrates are throughput limited due to the number of processing stations for processing the substrates and because of the care that is used for handling the substrates. Once manufactured, the optical devices are separated from the substrates without deforming the optical devices, which can be challenging.

Accordingly, what is needed in the art are methods for processing substrates without deforming the optical devices, and a processing system to handle the substrates at high throughput and without deforming the substrate.

SUMMARY

In one embodiment, a process of producing optical devices is provided. The process includes transferring a first substrate comprising one or more devices to a laser dicing tool, the laser dicing tool comprising a filamentation stage and a singulation stage. One or more device contours are scribed on the first substrate in the filamentation stage. The first substrate is cut along one or more device contours in the singulation stage and the devices are transferred for further processing.

In another embodiment, a system for fabricating devices is provided. The system includes a plurality of stages, each stage disposed below a corresponding optical head of a plurality of movable optical heads with each optical head corresponding to a laser. A conveyor system is coupled to the plurality of stages, and a sorting system includes a robot capable of moving devices from the conveyor system.

In yet another embodiment, a system for fabricating devices is provided including a first stage disposed below a first optical head. The first optical head is operable to direct a first laser beam from a first laser source toward the first stage. A second stage is disposed below a second optical head. The second optical head is operable to direct a second laser beam from a second laser source toward the second stage. The first stage and second stage are operable simultaneously with respect to one another. A forward conveyor system is coupled to the plurality of stages. A vision assembly includes a camera disposed above the conveyor system, and a sorting system includes a robot capable of moving devices from the conveyor system. The robot is communicatively coupled to the vision assembly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIGS. 3A and 3B are schematic, top views of substrate carriers according to some embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a laser dicing system for optical devices, and methods for processing optical devices. The system includes several processing stations capable of operating simultaneously with respect to one another. A two part laser dicing system is included which subjects the substrate to a first laser and to a second laser. The system provided herein enables simultaneous processing of a first substrate with the second laser as a second substrate is processed with the second laser. The system is fully automated and substrates are easily transferred from station to station using a substrate carrier. In this manner, throughput and automation is enhanced.

Figure 1:
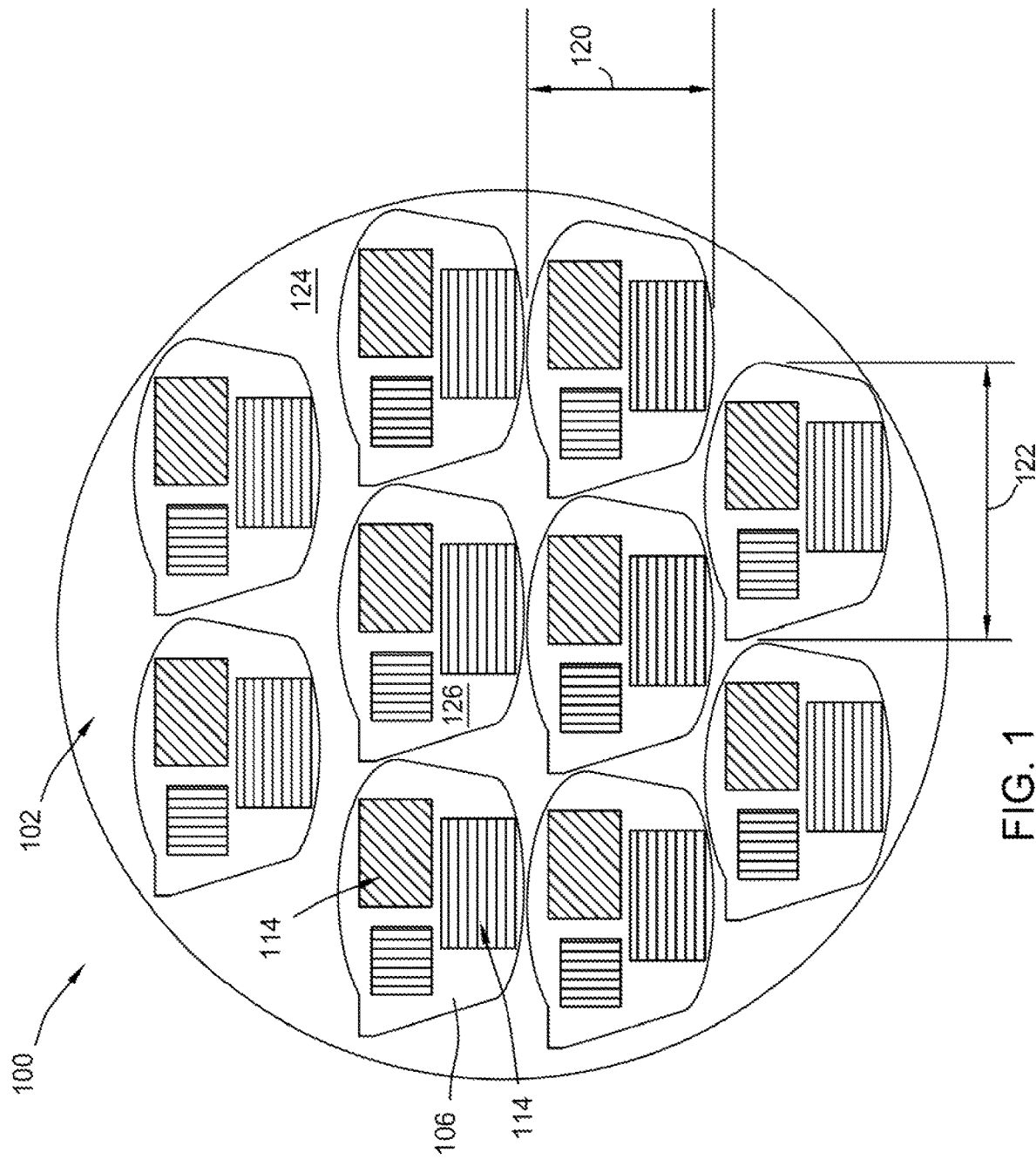
FIG. 1 is a schematic, top view of a first surface of a substrate according to an embodiment.
Figure 2:
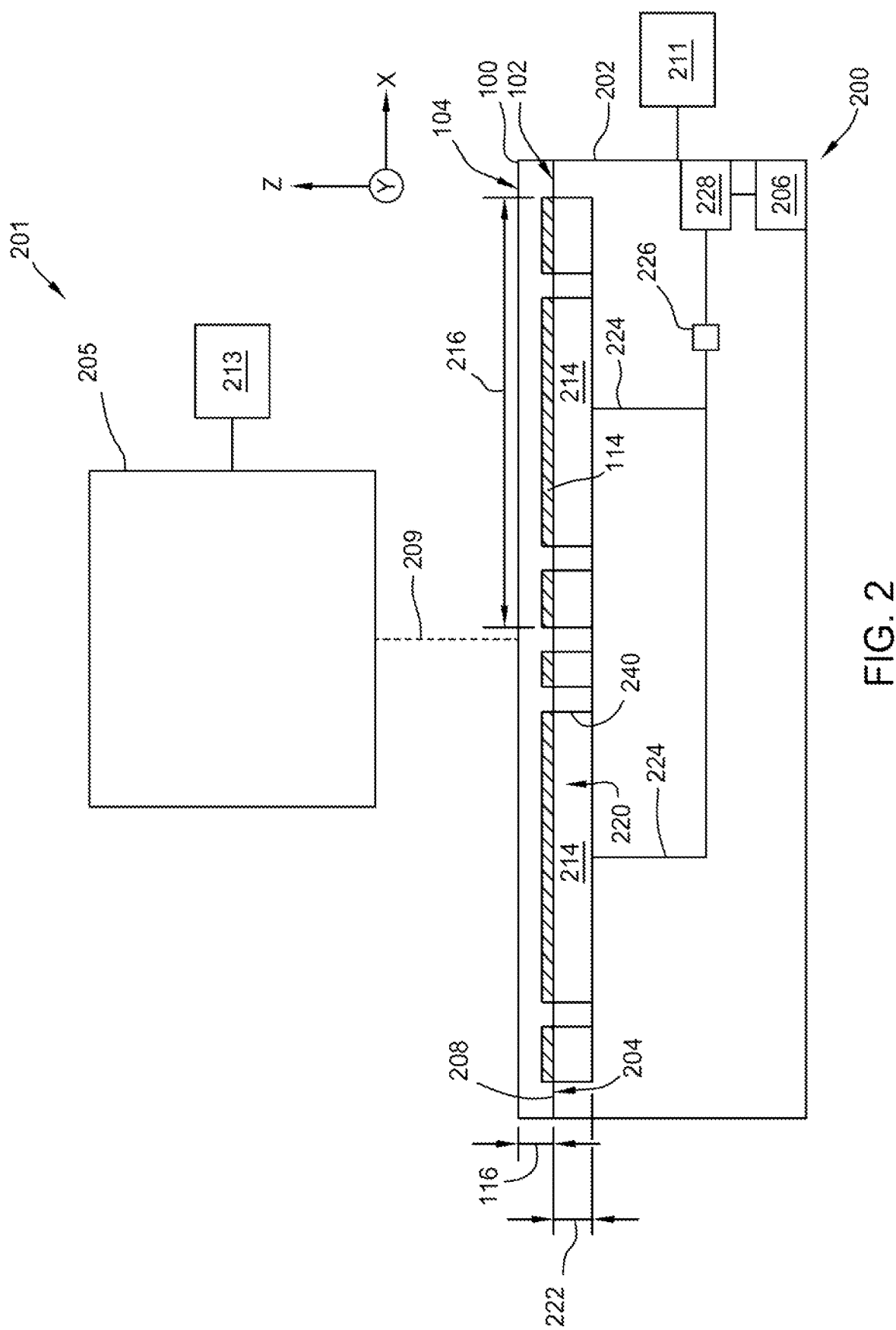
FIG. 2 is a schematic, cross-sectional view of a system including a substrate support assembly according to an embodiment.

FIG. 1 is a perspective, frontal view of a first surface 102 (i.e., top surface) of a substrate 100. The substrate 100 includes a second surface 104 (i.e., bottom surface visible in FIG. 2) opposite the first surface 102 (as shown in FIG. 2). The substrate 100 may be glass, plastic, silicon carbide, polycarbonate, or any other suitable material. In one embodiment, which can be combined with other embodiments described herein, the substrate 100 is transparent, such as transparent glass. The materials may have rollable and flexible properties. In one embodiment, which can be combined with other embodiments described herein, the substrate 100 has a thickness 116 (shown in FIG. 2) of less than about 1 millimeter (mm). In some embodiments, the thickness is less than 0.5 mm. The substrate 100 includes one or more optical devices 106, disposed on the first surface 102 and/or the second surface 104 of the substrate. The one or more optical devices 106 can include structures 114 (i.e., fins) having sub-micron critical dimensions, e.g., nano-sized critical dimensions.

The embodiments of the substrate support assembly 200 (shown in FIG. 2) described herein are operable to retain the substrate 100 having one or more optical devices 106 without contacting the structures 114 and without deforming the substrate 100. FIG. 2 is a schematic, cross-sectional view of a system 201 including a substrate support assembly 200. The substrate support assembly 200 is capable of supporting substrates 100 with different thicknesses, shapes and sizes for laser processing.

The system 201 includes one or more optical heads 205, such as a first swappable optical head. The first optical head 205 is configured to receive energy from one or more lasers from one or more laser sources, such as a first laser from a first laser source 213. The one or more laser sources direct one or more laser beams, such as first laser beam 209 to the second surface 104 of the substrate 100. The first surface having the optical devices 106 is faced away from the first laser beam 209. It has been found that facing the optical devices 106 away from the first laser beam 209 protects the structures 114 on the optical devices 106 to prevent device defects. The first laser beam 209 is operable to heat the edges of the optical devices 106 on the substrate 100 and provide an outline of the optical devices. In some embodiments, that can be combined with other embodiments described herein, the one or more laser sources includes an infrared laser and a $CO_2$ laser source. The laser sources can be any suitable electromagnetic energy of various wavelengths, such as ultraviolet, infrared, and the like.

The substrate 100 is retained on a support surface 204 of the substrate support assembly 200. In one embodiment, which can be combined with other embodiments described herein, a body 202 of the substrate support assembly 200 is coupled to an actuator 211. The body 202 of the substrate support assembly 200 can be made from any suitable material, such as aluminum. The actuator 211, in operation, moves the body 202 along an x-direction, a y-direction and/or a z-direction. In some embodiments, which can be combined with other embodiments described herein, one or more actuators 211 can be coupled to one or more stages to move the substrate 100 disposed thereon. The substrate support assembly 200 includes a controller 206 operable to be in communication with a system controller (not shown) and is operable to control aspects of the substrate support assembly 200 during processing.

The body 202 of the substrate support assembly 200 includes a plurality of projections 208. In one embodiment, which can be combined with other embodiments described herein, the body 202 and the projections 208 include stainless steel and/or aluminum containing materials. In another embodiment, which can be combined with other embodiments described herein, the body 202 and the projections 208 include ceramic containing materials.

The first surface 102 (i.e., top surface) of the substrate 100 is securable to the support surface 204 of the plurality of projections 208 without the one or more optical devices 106 contacting the support surface 204. Adjacent projections of the plurality of projections 208 form pockets 214. The pockets 214 have a width 216 and a length corresponding to a width 120 and a length 122 (as shown in FIG. 1) of the one or more optical devices 106 and a height 222. The plurality of projections 208 correspond to portions 124 of one of the first surface 102 and the second surface 104 without one of the optical devices 106 disposed thereon. The pockets 214 can also include one or more posts 240 that support the optical devices 106 at portions 126 of the optical device without structures 114 disposed thereon. When the substrate 100 is secured to the support surface 204 of the substrate support assembly 200, regions 220 are formed, in each of the pockets 214, between the body 202 of the substrate support assembly 200 and the optical devices 106 of one of the first surface 102 and second surface 104 secured to the support surface 204.

Each of the pockets 214 are operable to be coupled to a pocket conduit 224 in fluid communication with a vacuum source 228 via a vacuum flow controller 226, such as a MFC. The vacuum source 228 is operable to supply vacuum pressure through a respective pocket conduit 224 to a respective pocket 214 to retain portions of the substrate 100 corresponding to the support surface 204 of the projections 208 by maintaining a vacuum pressure in a respective region 220. In one embodiment, which can be combined with other embodiments described herein, the vacuum pressure is about 380 Torr to about 760 Torr. The controller 206 is operable to operate each vacuum flow controller 226 according to embodiments described herein.

FIGS. 3A and 3B are schematic, top views of substrate carriers 302A, 302B according to some embodiments. In some embodiments, which can be combined with other embodiments described herein, the substrate 100 is retained on a substrate carrier, such as substrate carrier 302A, 302B. In some embodiments, which can be combined with other embodiments described herein, the substrate support assembly 200 is capable of receiving a substrate retained on a substrate carrier 302A, 302B, such as substrate carrier 302A, 302B. The substrate carrier 302A, 302B includes a base plate 304. The base plate 304 is made from a lightweight material such as a material including carbon fiber. It has been found that the lightweight material of the base plate 304 enables the carrier to be transferred easily between processing stations, such as transferring the carrier 302A, 302B with a pick and place robot. In some embodiments, which can be combined with other embodiments described herein, the base plate is about 2 kg or less, such as about 1.5 kg or less, such as about 1 kg to about 1.4 kg. Conventional base plates are greater than about 2 kg, such as greater than about 3 kg. The base plate 304 is capable of retaining substrates of different shapes and sizes. The substrate carrier 302A, 302B includes a vacuum diaphragm 306A, 306B which approximates a shape and size of a substrate to be retained. The vacuum diaphragm 306A shown in FIG. 3A accommodates a round substrate with a first diameter, and vacuum diaphragm 306B shown in FIG. 3B accommodates a round substrate with a second diameter. The first diameter shown in FIG. 3A is smaller than the second diameter shown in FIG. 3B. The substrate is retained on the substrate carrier 302A, 302B using a retaining ring 308A, 308B, such as a clamp ring. The retaining ring 308A, 308B is positioned above the substrate 100 and is capable of securing the substrate 100 using magnets disposed below the substrate 100. The substrate 100 is assembled on the substrate carrier 302A, 302B to provide a stack in a build station, as shown in the build station 402 depicted in FIG. 4. In some embodiments, which can be combined with other embodiments described herein, the substrate carrier is capable of a substrate with a diameter of about 100 mm to about 350 mm, such as about 150 mm, about 200 mm, or about 300 mm.

Figure 4:
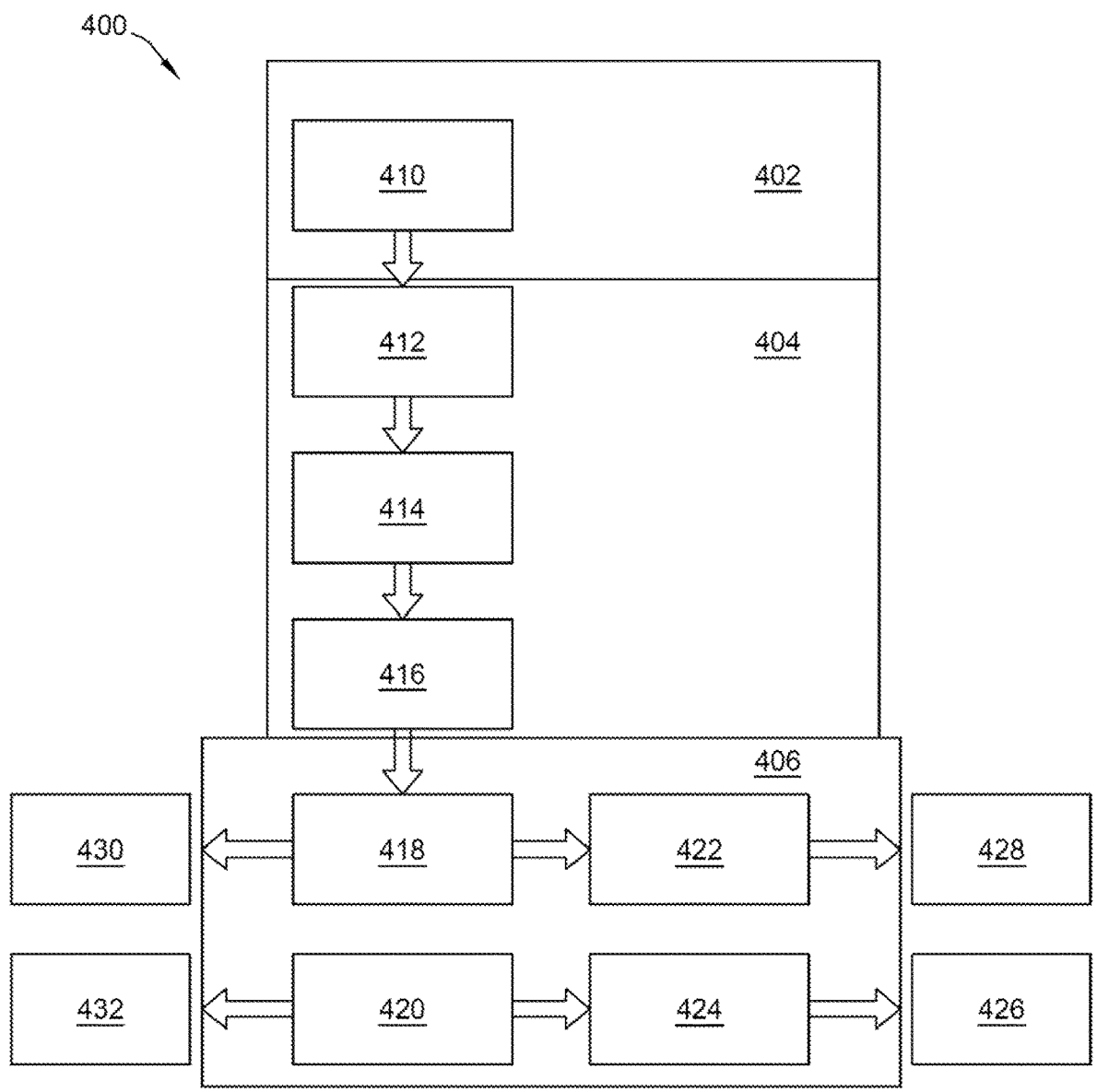
FIG. 4 is a flow diagram of a system for processing substrates according to an embodiment.
Figure 5:
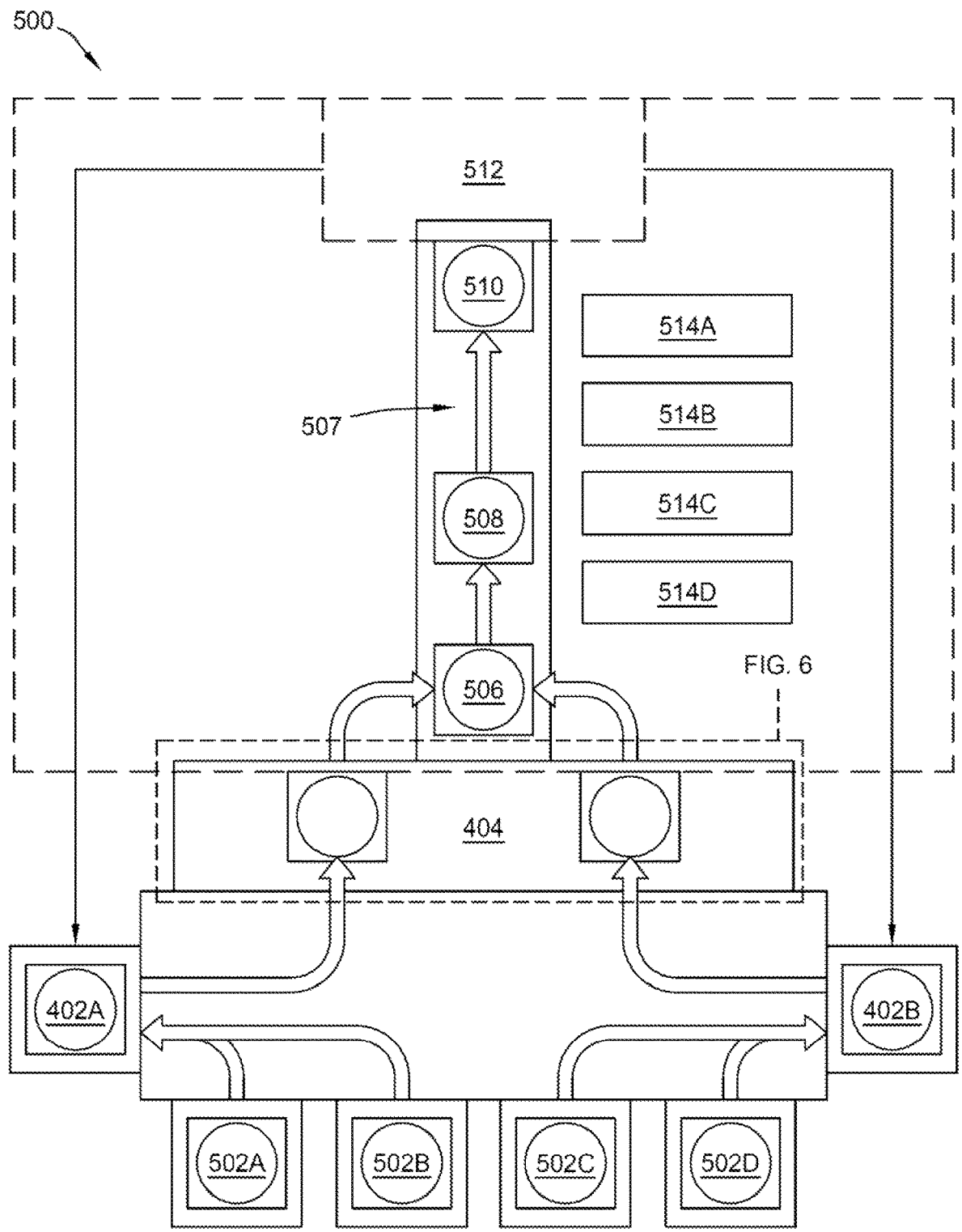
FIG. 5 is a plan view of a system for processing substrates according to an embodiment.

FIG. 4 is a flow diagram 400 of a system for processing substrates and FIG. 5 is a plan view of a system 500 for processing substrates according to an embodiment. The flow diagram of the system is described herein with reference to the system shown in FIG. 5. The system 500 includes a plurality of load ports 502A, 502B, 502C, 502D, such as a front opening unified pod ("FOUP"). The substrates 100 and substrate carriers 302A, 302B are stored in separate ports until the substrates 100 are ready for processing. Each load port includes a plurality of substrates 100 or a plurality of substrate carriers 302A, 302B. In some embodiments, which can be combined with other embodiments described herein, ports 502A and 502D include substrates 100 and ports 502B and 502C include substrate carriers 302A, 302B.

The substrates 100 and substrate carriers 302A, 302B are transferred to a build station 402 for assembly. For example, substrates from port 502A and substrate carriers from port 502B are transferred to build station 402A. Similarly, substrates from port 502D and carriers from port 502C are transferred to build station 402B. In operation 410, the substrates 100 are assembled onto substrate carriers 302A, 302B in the build station 402. Each substrate 100 together with a substrate carrier 302A, 302B forms a stack. The stack is transferred from the build station 402 to a laser dicing assembly 404. In operation 412, the stack is aligned in preparation for dicing. The alignment includes positioning the stack on a stage for laser dicing. Fiducials placed about the substrate are used as a reference for determining alignment. As used herein, the term "fiducials" refer to markings disposed on a substrate which are readable to determine an alignment of the substrate. Each stack is retrieved from the build station by a robot and aligned to a substrate support assembly 200 as depicted in FIG. 2. The substrate 100 or stack is secured on the body 202 of the substrate support assembly 200 of a laser dicing tool by the robot. The robot 508 can move substrates 100 to the laser dicing tool while the laser dicing assembly 404 is in operation. The simultaneous operation enables high substrate throughput and efficiency.

In operation 414, the substrate 100 is patterned with a laser dicing process which outlines the optical devices in the substrate. In operation 416, the substrate 100 is heated through the outlines to singulate the optical devices while supported by the substrate carrier 302A, 302B. Heating the outlines separates the devices from the substrate using thermal expansion. The power densities of the power beams used are directly proportional to the laser spot size. The processed substrate is transferred to a backend packaging station 406. The processed substrate is transferred using one or more forward conveyors 507. The backend packaging station 406 includes a vision station 506 for inspecting the optical devices and a sorting station. The sorting station includes a pick and place robot 508 for sorting the optical devices (e.g., operation 418). The vision station 506 includes one or more cameras disposed above the processed substrate 100. An image of the substrate is captured by the one or more cameras to determine alignment and to identify the presence of defective optical devices. In some embodiments, which can be combined with other embodiments described herein, the substrate is illuminated by a side LED light to illuminate the edges of the optical devices for imaging. In this manner, the vision station 506 camera is capable of determining the location and orientation of each of the optical devices. The vision station 506 is communicatively coupled to the robot 508 such that robot 508 is capable of transferring the substrate carrier 302A, 302B without contacting the optical devices and transferring optical devices from the substrate. The backend packaging station 406 includes one or more forward conveyors 507, such as conveyor belts. The stacks are transferred by the forward conveyors 507 to one or more robots 508. The robots 508 are configured to remove the optical devices 106 from the stacks.

The defective optical devices are discarded (e.g., operation 430) and the optical devices without defects are transferred to backend packaging (e.g., operation 422). The packaged optical devices are further processed at backend processors, such as in an edge blackening station (e.g., operation 428). The substrates 100 with optical devices removed, are separated from the substrate carriers 302A, 302B (e.g., operation 420) and the broken substrates 100 are separated from the carriers (e.g., operation 432). The laser dicing process performed on the stack described herein enables the substrate carrier within the stack to collect debris that results from dicing. The carriers are removed from the substrate with the debris. The resulting optical devices with structures facing away from the lasers are free of defects and contaminants such as particulates from the debris left behind by laser dicing. A plurality of backend storage ports or trays 514A, 514B, 514C, 514D are used to store the separated and sorted components, such as defective optical devices, non-defective optical devices, and different types of optical devices.

The carriers are cleaned (e.g., operation 424) at cleaning station 510 using a vacuum module and the cleaned carriers are reused for further processing (e.g., operation 426). The carriers with the debris can be cleaned in situ and collected for future use. In some embodiments, which can be combined with other embodiments described herein, the cleaned carriers are positioned on a return conveyor 512 and returned to a load port or a build station in a continuous loop process. In some embodiments, which can be combined with other embodiments described herein, the return conveyor comprises a cross conveyor portion and a return portion. The return portion of the conveyor is substantially parallel to the front conveyor. One or more of the operations 410 to 432 are carried out simultaneously with one another in a continuous process of multiple substrates. In some embodiments which can be combined with other embodiments described herein, a substrate is processed in one operation while another substrate is processed in another operation.

Figure 6:
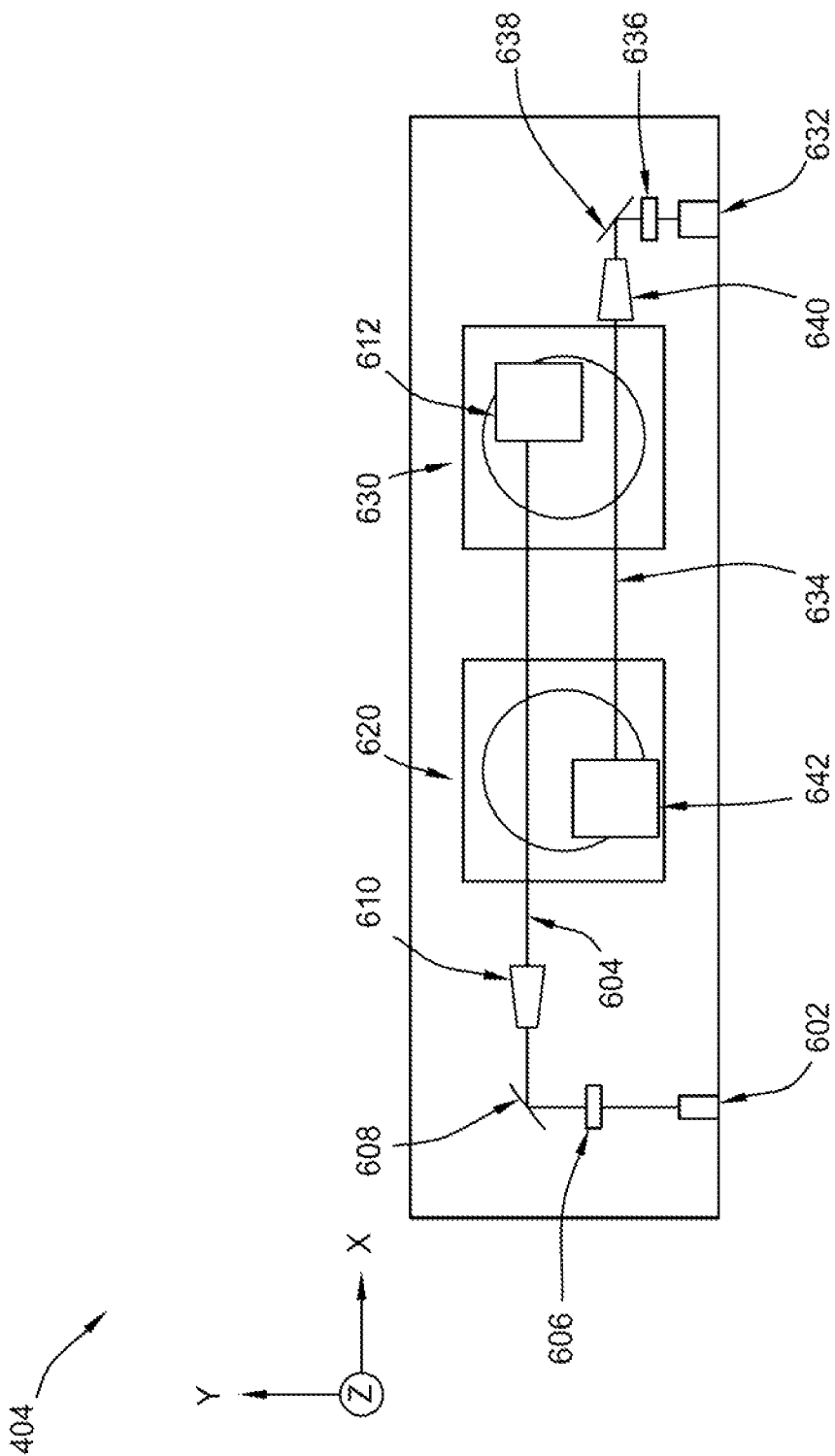
FIG. 6 is a schematic, top view of a laser dicing assembly according to an embodiment.

FIG. 6 is a schematic, top view of a laser dicing assembly 404 according to an embodiment. The laser dicing assembly 404 includes two or more stages 620, 630. The stages 620, 630 are each capable of moving in each direction (X, Y, Z axis) and rotating about the Z axis (e.g., 8). Each stage includes a substrate support as described with reference to FIG. 2. Each stage (e.g., first stage 620, second stage 630) corresponds to a laser source (e.g., first laser source 602, second laser source 632). The first laser source 602 emits a first laser along a first beam path 604. The first beam path is directed to the first optical head 612 using a first set of one or more turning mirrors or steerers 606, 608, and a first set of one or more beam expanders 610. The first optical head 612 is movable along a line parallel to the X-axis and directs the first laser beam toward a first substrate disposed on first stage for processing the first substrate. The first laser beam is from an infrared laser source, or any laser capable of filamenting, or dicing in a substrate. The filamentation process includes exposing the stack to a first laser beam to heat and outline (e.g., "scribe contour") the edges of an optical device on the stack. The first optical head 612 is positioned above the second stage 630 for processing a second substrate disposed on the second stage.

Similarly, the second laser source 632 emits a second laser along a second beam path 634. Although FIG. 6 depicts the first and second optical heads 612, 642 to be disposed on different positions along the Y-axis and the same position along the Z-axis, it is also contemplated for the first and second optical heads 612, 642 to be on the same position along the Y-axis and on different positions along the Z-axis. Alternatively, the optical heads 612, 642 are positioned at different locations along the Z-axis and the Y axis. It is appreciated that positioning the optical heads 612, 642 along different positions along the z-axis enables processing of substrates simultaneously using a relatively small space. The second laser beam is from a $CO_2$ laser source, or any laser capable of singulating the optical devices from the substrate. The singulation process releases the optical device at the scribe contour created by filamentation. The first and second laser beams are selected based on the composition of the substrate, such as a glass substrate or a silicon carbide substrate. In some embodiments, which can be combined with other embodiments described herein, the substrate is a silicon carbide substrate and the first laser beam source includes a nanosecond (ns) UV laser. Each of the first and second laser beams are selected from a group consisting of UV, green, and IR. In particular, UV, green, and IR lasers can be used for filamentation and/or singulation of silicon carbide or glass substrates. Additionally, $CO_2$ lasers can be used for singulation of glass substrates. The laser sources include picosecond, femtosecond, or nanosecond laser sources. The second beam path 634 is directed to the second optical head 642 using a second set of one or more turning mirrors and steerers 636, 638, and a second set of one or more beam expanders 640. The second optical head 642 is movable along a line parallel to the X-axis and directs the second laser beam toward the first substrate disposed on the first stage 620. The second optical head 642 is positioned above the second substrate disposed on the second stage 630. The system enables processing different substrates simultaneously with respect to one another using dedicated optical heads disposed above the stages. Each optical head includes a focusing element, a plurality of optical lenses. Although IR and $CO_2$ lasers are described and depicted herein, the filamentation and singulation processes can be done using any suitable laser or cutting techniques available. It has been found that filamentation and singulation reduces chipping, microcracks, delamination and other damage that can occur in optical device fabrication. The system described herein is capable of operating both filamentation and singulation simultaneously with one another and with other tools and operations used to process substrates allowing for high throughput.

In one embodiment, which can be combined with other embodiments of the present disclosure, a first stack can be processed in the filamentation process on a first stage 620 followed by the singulation process. As the first stack is processed in the singulation process, a second stack can be processed at the filamentation process. The first laser source 602 can transmit infrared ("IR") energy to a first optical head 612, the first optical head 612 can direct the energy to the stacks disposed on the first stage 620. In some embodiments, which can be combined with other embodiments described herein, the first optical head is movable within a first plane and the second optical head is movable within a second plane. The first plane and the second plane are the same or are different with respect to the Z-axis.

In summation, the present disclosure generally relates to a laser dicing system for optical devices, substrate support assemblies for retaining a surface of a substrate having one or more optical devices disposed on the surface without contacting the one or more optical devices and deforming the substrate, and methods for processing optical devices.

While the foregoing is directed to examples of the present disclosure, other and further examples of the disclosure may be devised without departing from the basic scope thereof, and the scope thereof is determined by the claims that follow.

What is claimed is:

1. A process of producing optical devices, comprising:
   transferring a first substrate comprising a plurality of optical devices to a laser dicing tool, each optical device of the plurality of optical devices having a contour surrounding regions of device structures, the laser dicing tool comprising a filamentation stage and a singulation stage;
   dicing the plurality of optical devices, each optical device is diced along the contour surrounding regions of the device structures, the first substrate is disposed in the filamentation stage with projections of the filamentation stage contacting portions of the plurality of optical devices between the regions of device structures;
   separating the plurality of optical devices, each optical device is separated along the surrounding regions of the device structures, the first substrate disposed in the singulation stage with projections of the singulation stage contacting portions of the plurality of optical devices between the regions of device structures; and
   transferring the devices to a backend storage port or to a backend processor.

2. The process of claim 1, further comprising securing the first substrate on a substrate carrier prior to transferring the first substrate to the laser dicing tool.

3. The process of claim 2, further comprising:
   separating the first substrate from the substrate carrier;
   cleaning the substrate carrier;
   transferring the substrate carrier to a loading port or to a build station for securing a second substrate on the carrier; and
   transferring the second substrate together with the carrier to the laser dicing tool.

4. The process of claim 1, further comprising inspecting the devices on the first substrate.

5. The process of claim 4, wherein inspecting the devices comprises taking a top-down image of the first substrate.

6. The process of claim 5, further comprising separating defective devices from good devices.

7. The process of claim 1, further comprising dicing a third substrate at the filamentation stage, wherein dicing the third substrate is simultaneous with cutting the first substrate at the singulation stage.

8. A process of producing optical devices, comprising:
   transferring a filamented substrate from a filamentation stage to a singulation stage of a laser dicing tool, the filamented substrate comprising a first plurality of optical devices that are each filamented along a contour surrounding regions of first device structures, the filamented substrate is disposed in the singulation stage with projections of the singulation stage contacting portions of the first plurality of optical devices between the regions of the first device structures;
   transferring a second substrate comprising a second plurality of optical devices to the filamentation stage, each optical device of the second plurality of optical devices of the second substrate having a contour surrounding regions of second device structures, the second substrate is disposed in the filamentation stage with projections of the filamentation stage contacting portions of the second plurality of optical devices between the regions of the second device structures; and conducting a filamentation process on the second substrate while conducting a separation process on the filamented substrate, the filamentation process comprising filamenting each of the second plurality of optical devices of the second substrate along the contour surrounding the regions of the second device structures, and the separation process comprising separating each of the first plurality of optical devices of the filamented substrate along the surrounding regions of the first device structures.

\* \* \* \* \*